United States Patent
Woolstenhulme

(10) Patent No.: US 7,140,064 B1
(45) Date of Patent: Nov. 28, 2006

(54) DISPOSABLE SCRUBBER ATTACHMENT FOR WIPERS

(76) Inventor: Kevin J. Woolstenhulme, 480 N. 100 East, Kaysville, UT (US) 84037

( * ) Notice: Subject to any disclaimer, the term of this patent is extended or adjusted under 35 U.S.C. 154(b) by 42 days.

(21) Appl. No.: 11/183,670

(22) Filed: Jul. 18, 2005

(51) Int. Cl.
    *B60S 1/38* (2006.01)

(52) U.S. Cl. .............................. 15/250.361; 15/250.4; 15/250.41; 15/244.3

(58) Field of Classification Search ............ 15/250.41, 15/250.4, 250.48, 250.361, 245, 244.3, 246
See application file for complete search history.

(56) References Cited

U.S. PATENT DOCUMENTS

| | | | |
|---|---|---|---|
| 1,846,885 A * | 2/1932 | Manuel | 15/250.32 |
| 3,417,421 A * | 12/1968 | Retke | 15/250.41 |
| 3,631,561 A * | 1/1972 | Aszkenas | 15/250.41 |
| 3,828,388 A * | 8/1974 | Fuhr | 15/250.41 |
| 4,103,384 A * | 8/1978 | Priesemuth | 15/250.03 |
| 4,293,975 A * | 10/1981 | Ainsworth | 15/250.41 |
| 5,864,913 A * | 2/1999 | Robertson et al. | 15/121 |
| 6,038,729 A * | 3/2000 | Feigenbaum | 15/250.41 |
| 6,070,287 A * | 6/2000 | Kornegay | 15/250.001 |
| 2005/0235448 A1 * | 10/2005 | Richard | 15/257.01 |

FOREIGN PATENT DOCUMENTS

DE 10250874 * 2/2004

* cited by examiner

*Primary Examiner*—Gary K. Graham

(57) ABSTRACT

A disposable scrubber attachment for a windshield wiper effective in removing insect remains on a windshield glass is provided. The scrubber attachment is constructed by an elongated piece of a foam rubber wrapper in an elongated mesh netting. On one side of the foam rubber, a V-shaped channel is formed for intimately engaging a wiper blade. A fastening means, such as Velcro may be used to fasten the scrubber attachment to the wiper blade.

6 Claims, 2 Drawing Sheets

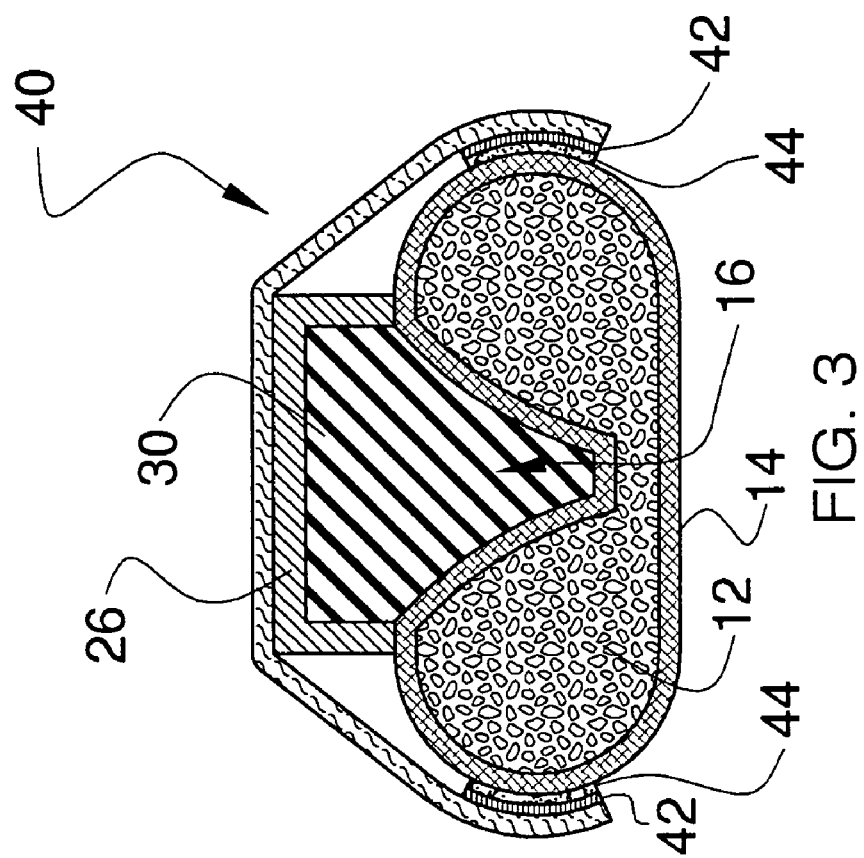
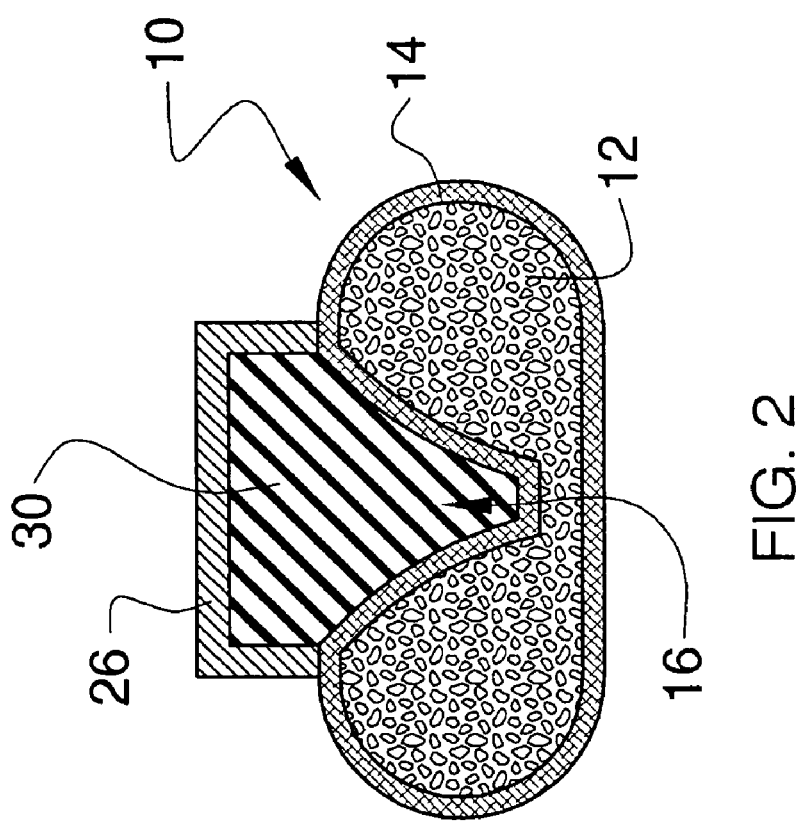

DISPOSABLE SCRUBBER ATTACHMENT FOR WIPERS

FIELD OF THE INVENTION

The present invention generally relates to an attachment for a windshield wiper and more particularly, relates to a disposable attachment for windshield wipers that is especially suited for scrubbing insect remains off the windshield glass of a motor vehicle.

BACKGROUND OF THE INVENTION

Windshield wipers have been used on motor vehicles since the motor vehicles have been invented. A windshield wiper assembly normally includes a control arm and a rubber blade for wiping and scrubbing. When a windshield wiper assembly is used in conjunction with a spray of windshield washing fluid on the glass, it is efficient in removing dirt and other normal debris found on a vehicle windshield after normal operation of the vehicle. However, when a motor vehicle has been operated at higher speeds, and especially in a rural location, i.e. driving on an expressway, flying insects are smeared on the windshield and become stubborn deposits that are very difficult to remove by the rubber blade and the washing fluid. After an extended period of expressway driving, one has to stop the vehicle on the roadside or at a gas station and try to clean the smeared insect remains from the windshield with a squeegee and a bucket of detergent. This becomes a hassle for long distance travelers, such as a professional truck driver to have to constantly clean his windshield.

It is therefore an object of the present invention to provide an attachment for a wiper blade that can be used to clean insect remains from a windshield effectively.

It is another object of the present invention to provide a wiper blade attachment for effectively cleaning insect remains from a windshield that is low cost and readily disposable after use.

It is yet another object of the present invention to provide a wiper blade attachment that can be easily attached to wiper blade for cleaning insect remains from a windshield.

SUMMARY OF THE INVENTION

In accordance with the present invention, a disposable scrubber attachment for a windshield wiper blade that can be effectively used to clean insect remain from a windshield glass is provided.

In a preferred embodiment, the disposable scrubber attachment for a wiper blade is constructed of a length of foam rubber wrapped in a nylon mesh netting wherein one side of the attachment is formed in a V-shaped channel adapted for engaging a wiper blade. The elongated disposable scrubber attachment is further equipped with at least two attachment means with one at each and for fastening to the wiper blade. A suitable attachment means may be a hook-end loop device, such as Velcro.

When a windshield is smeared with insect remains that affects the visibility of a driver, the driver can stop on the roadside and attach the present invention disposable scrubber attachment to the windshield wiper blade. After fastening with the Velcro strips on the attachment, the scrubber attachment can be operated in a manner similar to that for a conventional wiper blade while a windshield washer fluid is sprayed on the windshield to further loosen the debris. After use, the present invention scrubber attachment can be easily disposed and a new one used in the next cleaning process, if necessary.

BRIEF DESCRIPTION OF THE DRAWINGS

The invention will now be described, by way of example, with reference to the accompanying drawings, in which:

FIG. 2 is an enlarged, cross-sectional view of the present invention scrubber attachment with its V-shaped channel receiving a wiper blade.

FIG. 3 is an enlarged, cross-sectional view of the present invention scrubber attachment fastened to a wiper blade by a hook-and-loop fastening device.

DETAILED DESCRIPTION OF THE INVENTION

Figure 1:
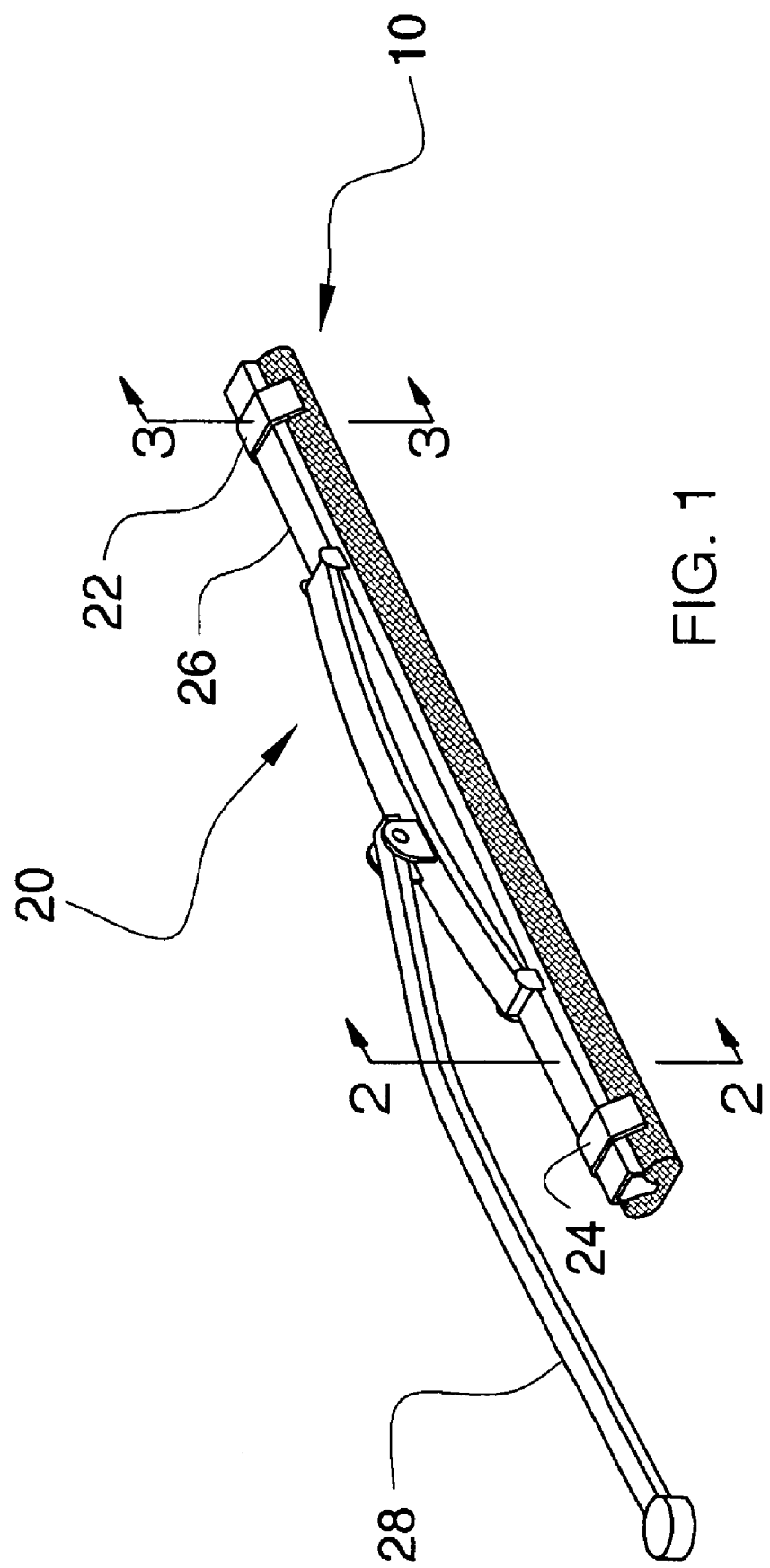
FIG. 1 is a perspective view of the present invention disposable scrubber attachment that is installed on a windshield wiper.

The present invention provides a disposable scrubber attachments for a windshield wiper that can be fabricated at low cost and disposable after use.

The disposable scrubber attachment is fabricated of an elongated piece of a foam rubber, which is wrapped in an elongated piece of nylon mesh netting. On one side of the foam rubber/nylon mesh netting assembly is formed a V-shaped channel adapted for receiving a wiper blade. After a length of the foam rubber/nylon mesh netting assembly is mated to the wiper blade of the same length, fastening means such as Velcro attachment is used to fasten the scrubber to the wiper blade body, i.e. the wiper blade metal support.

The present invention disposable scrubber for removing insect remains from the windshield of a motor vehicle can be advantageously used after the vehicle has been operating on an expressway for an extended period of time. The scrubber attachment cleans the insect remains off the windshield glass in a quick and efficient manner such that full visibility can be restored for the driver.

A typical size of the present invention scrubber attachment may be one (1") inch tall, eighteen (18") inches long and one (1") inch wide. Along one side of the attachment is formed a V-shaped channel that is made of rubber or plastic for mating to the windshield wiper blade. A plastic clip can also be used as a fastening means, in addition the Velcro attachment method, to hold the scrubber attachment in place against the wiper blade. To efficiently clean the insect remains, the outside of the V-shaped channel is surrounded by a foam rubber cushioning with a plastic mesh netting skin. The foam rubber is used to absorb windshield washer fluid that is sprayed on the windshield glass, while the mesh netting scrubs loose insect remains without scratching the windshield.

When insect remains start accumulating on the windshield of a vehicle after extending driving time such that the driver's visibility is adversely affected, the driver can pull over and attach the present invention to the windshield wiper blade to efficiently clean the windshield glass. The scrubber attachment can be slipped under the windshield wiper blade and clipped into place by plastic clips, or by Velcro-type fastening strips. By spraying washer fluid onto the glass, the foam rubber in the scrubber attachment absorbs the cleaner while the nylon mesh netting scrubs the insect remains loose. This effectively removes stubborn insect remains normally smeared over the windshield by the windshield wiper blade. After use, the scrubber attachment can be easily removed and disposed of by the user.

Since the scrubber attachment can be fabricated at low cost and sold at a low-price, a new one may be used each time the windshield glass needs cleaning.

The present invention scrubber attachment, therefore is light weight, effective, disposable, simple to use and can be adapted to various vehicles.

Referring now to FIG. 1, wherein a perspective view of the present invention scrubber attachment 10 that is fastened to a windshield wiper assembly 20 is shown.

A detailed view for the construction of the scrubber attachment 10 is shown later in FIGS. 2 and 3.

The scrubber attachment 10, shown in FIG. 1 is fastened to the wiper assembly 20 by a pair of fastening means 22, 24 which may be plastic clips or Velcro strips mounted over the metal support 26 of the wiper assembly. The wiper assembly 20 further includes a control arm 28 for operating the wiper system.

An enlarged cross-sectional view of the present invention scrubber attachment 10 is shown in FIG. 2, attached to a wiper blade 30. The scrubber attachment 10 is formed by an elongated strip of foam rubber 12 that is wrapped in an elongated piece of nylon mesh netting 14 with a V-shaped channel 16 formed on one side of the scrubber attachment 10. The V-shaped channel 16 is formed by a thermolforming process in a mold by densifying the foam rubber in the immediate adjacent area of the V-shaped channel 16. The V-shaped channel 16 may also be formed by adding a solid piece of plastic or rubber in the V-shaped and adhesively bounded to the scrubber attachment 10. This is not shown in FIG. 2.

The V-shaped channel 16 formed on the scrubber attachment 10 allows an intimate contact with the wiper blade 30 such that when a fastening device 40 (FIG. 3) is used, the scrubber attachment 10 is securely fastened to the wiper assembly 20. It should be noted that, in FIG. 3, the fastening device 40 is a hook-and-loop means, i.e. a Velcro strip. However, any other suitable fastening means such as a plastic clip formed to grab the two edges of the scrubber attachment 10 securely may also be used. Even though the installation of the plastic clips (not shown) must not interfere with the operation of the scrubber attachment, i.e. must not scratch the windshield glass. As shown in FIG. 3, the Velcro strip 40 has a layer of loop 42, which is attached to a layer of hook 44.

While the preferred embodiments of the invention have been described above, it will be recognized and understood that various modifications can be made in the invention and the appended claims are intended to cover all such modifications which may fall within the spirit and scope of the invention.

What is claimed is:

1. A disposable scrubber attachment for a wiper assembly comprising:
    an elongated member of foam rubber;
    an elongated nylon-mesh netting wrapping an outer surface of said elongated member of foam rubber, said netting having a pair of spaced hook layers attached at each end, on opposite sides thereof;
    a V-shaped channel formed on one side of the elongated member of foam rubber adapted for intimately engaging a wiper blade of said assembly; and
    at least two fastening means for securely attaching the elongated member of foam rubber to said wiper blade each said fastening means including an elongated strip with a loop layer attached at each end for engagement with said hook layers.

2. The disposable scrubber attachment for a wiper assembly according to claim 1, wherein said elongated member of foam rubber and said elongated nylon mesh netting are cut to length similar to a length of said wiper blade.

3. The disposable scrubber attachment for a wiper assembly according to claim 1, wherein said elongated member of foam rubber is fabricated of an elastomer selected from the group consisting of nitrile rubber, EPDM rubber and fluorosilicone rubber.

4. The disposable scrubber attachment for a wiper assembly according to claim 1, wherein said V-shaped channel is formed under heat—and pressure.

5. The disposable scrubber attachment for a wiper assembly according to claim 1, wherein said V-shaped channel is formed in a thermolforming process.

6. The disposable scrubber attachment for a wiper assembly according to claim 1, wherein said fastening means is straddled adapted for straddling over a metal support of the wiper assembly.

* * * * *